(12) United States Patent
Yokoo et al.

(10) Patent No.: US 7,316,823 B2
(45) Date of Patent: Jan. 8, 2008

(54) PROCESSED MANGO JUICE AND BEVERAGE CONTAINING IT

(75) Inventors: Yoshiaki Yokoo, Osaka (JP); Takayuki Miyai, Kyoto (JP); Shigemi Yokoo, Osaka (JP)

(73) Assignee: Suntory Limited, Osaka (JP)

( * ) Notice: Subject to any disclaimer, the term of this patent is extended or adjusted under 35 U.S.C. 154(b) by 0 days.

(21) Appl. No.: 10/076,657

(22) Filed: Feb. 19, 2002

(65) Prior Publication Data
US 2002/0155211 A1 Oct. 24, 2002

(30) Foreign Application Priority Data
Feb. 19, 2001 (JP) .............................. 2001-042386

(51) Int. Cl.
*A23L 2/02* (2006.01)
(52) U.S. Cl. ........................ 426/106; 426/592; 426/599
(58) Field of Classification Search ................... 426/15, 426/106, 590, 592, 599
See application file for complete search history.

(56) References Cited

U.S. PATENT DOCUMENTS

| 5,411,755 | A | * | 5/1995 | Downton et al. | ........... | 426/599 |
| 5,468,508 | A | * | 11/1995 | Wu et al. | .................... | 426/316 |
| 5,756,141 | A | | 5/1998 | Chen et al. | .................. | 426/599 |
| 6,383,546 | B1 | | 5/2002 | Powrie et al. | ............... | 426/599 |

FOREIGN PATENT DOCUMENTS

| DE | 4122634 A1 | * | 3/1992 |
| DE | 201 02 826 U1 | | 8/2001 |
| EP | 0 390 687 | | 10/1990 |
| JP | 6-269263 | | 9/1994 |
| JP | 08-154637 | | 6/1996 |
| JP | 11-206349 | | 8/1999 |
| WO | WO 01 84958 A2 | | 11/2001 |

OTHER PUBLICATIONS

Singh et al, "Physico-chemical changes during enzymatic liquefaction of mango pulp (cv. Keitt)," Journal of Food Processing and Preservation 24 (1) 73-85 2000 Cent. Food Tech. Res. Inst., Mysore 570 013, India. XP001079371.

Hicks, "Production and Packaging of Non-Carbonated Fruit Juices and Fruit Beverages," 1990, Blackie and Son Ltd., XP002201949 912419, p. 115, paragraph 3, p. 120, paragraph 4, p. 170, paragraph 6-p. 171, paragraph 1.

Vailliant et al, "Strategy for economical optimisation of the clarification of pulpy fruit juices using crossflow microfiltration," Journal of Food Engineering 48 (1) 83-90 2001, XP002201946.

(Continued)

*Primary Examiner*—Drew Becker
(74) *Attorney, Agent, or Firm*—Nixon & Vanderhye P.C.

(57) ABSTRACT

Beverages with little sedimentation and low viscosity exhibit excellent flavor derived from fruit juice, as well as a process for their production and processed fruit juice used in the process. Adding processed mango juice containing large amounts of insoluble components as flavor components derived from the juice provides beverages with little sedimentation and low viscosity, exhibiting excellent flavor derived from the juice, even after depulping, a treatment to prevent sedimentation.

13 Claims, 2 Drawing Sheets

OTHER PUBLICATIONS

Gagrani et al, "Preparation of fruit flavoured beverage from whey," Journal of Food Science and Technology, India 1987 Coll. of Agric. Tech., Marathwada Agric. Univ., Parbhani-431 402, India, vol. 24, No. 2, pp. 93-94, XP001084977.

Mosso et al, "Yield in juices, nectars and drinks from tropical fruits grown in Cote dlvoire," Sciences Des Aliments 1994 IAA/ENSA, BP 1313, Yamassoukro, Ivory Coast, vol. 14, No. 3, pp. 291-300, XP001084971.

Obisanya e tal, "Production of Wine from Mango Mangifera-Indicia L. Using *Saccharomyces* and *Schizosaccharomyces* Species Isolated from Palm Wine," Journal of Applied Bacteriology, vol. 63, No. 3, 1987, pp. 191-196, XP002201947.

Akubor, "The suitability of African bush mango juice for wine production," Plant Foods for Human Nutrition 1996 Dep. of Food Tech., Fed. Polytechnic, PMB 1037 Idah, Nigeria, vol. 49, No. 3, pp. 213-219, XP002201948.

Singh et al, "Physico-chemical changes during enzymatic liquefaction of mango pulp (cv. Keitt)", Journal of Food Processing and Preservation 24 (1) 73-85 2000 Cent. Food Tech. Res. Inst., Mysore 570 013, India, XP001079371 (1999).

Inryo Yogo Jiten [Dictionary of Beverage Terms] Beverage Japan, p. 70 (1999).

Saishin Kaju/Kajitsu Inryo Jiten Revised Dictionary of Juice and Fruit Drinks, Japan Fruit Juice Assn. p. 574 (1997).

"Membrane Technology Application Manual", editors Haruhiko Oya and Atsuo Watanabe, Published by Korin Publishing Co., Ltd., and published Sep. 30, 1999.

"Dictionary of Beverage Terminology", editors Japan Soft Drink Association, Japan Carbonated Beverage Inspection Association, published by Beverage Japan Inc., and published Jun. 25, 1999.

* cited by examiner

FRUIT JUICES AND THEIR TURBIDITY WITH AND WITHOUT DEPULPING

MANGO PUREE CENTRIFUGAL EFFECTS (XG) AND SIZE DISTRIBUTION PATTERNS

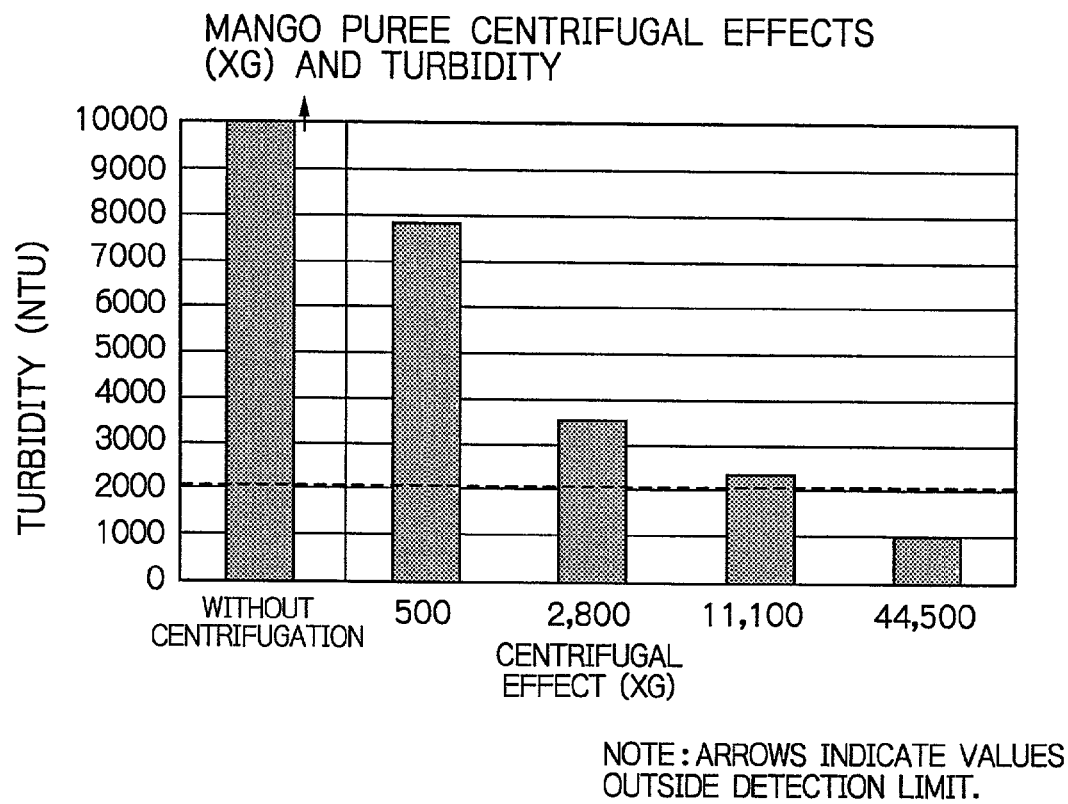

PROCESSED MANGO JUICE AND BEVERAGE CONTAINING IT

BACKGROUND OF THE INVENTION

The present invention relates to a fruit juice-containing beverage. More specifically, it relates to a beverage which exhibits little sedimentation, has low viscosity and possesses an excellent flavor derived from the fruit juice, as well as to a process for its production and processed mango juice used therein.

Fruit juice is the juice obtained by pressing healthy mature fruit, and beverages using fruit juice as the raw material (hereunder referred to as "fruit juice-containing beverages") include non-alcoholic beverages such as soft drinks and the like, and alcoholic beverages such as wines and liqueurs.

Fruit juice consists of water-soluble components and insoluble components and, therefore, is cloudy. The insoluble components are composed of fibrous matter, proteins, pectins, gummy matter and the like, and have the effect of providing the mild taste and richness characteristic of natural fruits ("Inryo Yogo Jiten" [Dictionary of Beverage Terms], published by Beverage Japan, p.70), thus constituting an important contribution to the flavor of fruit juice-containing beverages. The insoluble components are composed of insoluble solids (hereunder referred to as "pulp") as defined according to the Japan Agricultural Standards Test, and other insoluble components.

However, fruit juice-containing beverages prepared from fruit juices as raw materials have required methods for preventing sedimentation, because the insoluble components precipitate, leading to easy sedimentation with passage of time and thus lowering the product value. In order to prevent sedimentation it has been common to use non-cloudy, transparent fruit juice (clarified fruit juice), or to use fruit juice with reduced pulp content, i.e., depulped fruit juice, but removal of the pulp which is one of the flavor components creates the problem of loss of the excellent flavor derived from the fruit juice.

One type of beverage which exhibits little sedimentation and maintains the excellent flavor derived from juice is Nectar (registered trademark). This is a creamy, viscous beverage with lower sedimentation, obtained by mechanically refining (homogenizing) the pulp portion in fruit using a high-pressure homogenizer or the like, to increase the turbidity.

However, low viscosity beverages, i.e. beverages that are easy to drink and have excellent swallowability are highly desired on the commercial market, and several inventions have been developed for the purpose of both preventing sedimentation of insoluble components and reducing viscosity.

Japanese Unexamined Patent Publication HEI No. 6-269263 discloses an insoluble component-containing beverage obtained by addition of low strength agar with adjusted jelly strength and agar concentration, the agar component molecules of which are shortened, with the object of providing a beverage with lower sedimentation of insoluble components while maintaining smooth swallowability without a pasty feel.

Japanese Unexamined Patent Publication HEI No. 8-154637 discloses a solid pulp-containing peach beverage and process for its production, with the object of providing a process for production of a peach beverage which gives a refreshing feeling with the flavor of peach pulp, and is easy to drink.

In addition, Japanese Unexamined Patent Publication HEI No. 11-206349 discloses chopped pulp sacs and a process for production of chopped pulp sacs and a pulp sac-containing beverage, where the object is to provide a pulp sac-containing beverage with superior swallowability and texture without losing the natural image of a citrus pulp sac-containing beverage, while avoiding the problem of fluid leakage even when paper containers are used.

These inventions all provide processes with their respective features, but they are each partially unsatisfactory in regard to the issue of providing beverages with little sedimentation, low viscosity and the excellent flavor derived from fruit juice, and hence there is a need for development of a technique which offers a wider range of application by a more simple method.

SUMMARY OF THE INVENTION

It is therefore an object of the present invention to provide a fruit beverage with little sedimentation, low viscosity and the excellent flavor derived from the fruit juice, as well as a process for its production. It is another object to provide processed fruit juice suitable for production of the beverage.

BRIEF DESCRIPTION OF THE DRAWINGS

FIG. 3 is a bar graph showing the turbidity of processed mango juice prepared with different centrifugal effects (×G).

DETAILED DESCRIPTION OF THE INVENTION

Figure 1:
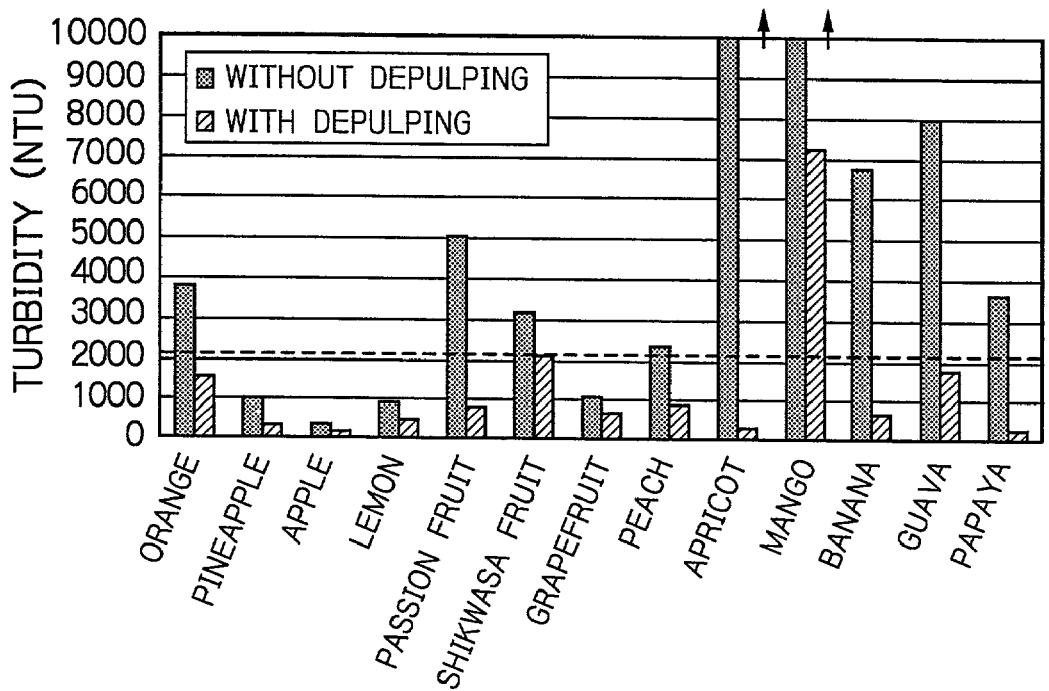
FIG. 1 is a bar graph showing the turbidity of different fruit juices with and without depulping.

Generally speaking, depulping of fruit juice eliminates almost all of the insoluble components, which are the flavor components derived from the fruit juice, from the processed fluid. However, the present inventors found, surprisingly, that when mango juice is used as the fruit juice, the processed juice obtained after depulping to prevent sedimentation contains a large quantity of insoluble components.

This processed juice was also used to produce a processed mango juice-containing beverage. As a result there was obtained a beverage with little sedimentation, low viscosity and having the excellent flavor derived from the fruit juice, thus completing the present invention.

PREFERRED EMBODIMENT OF THE INVENTION

The present invention will now be explained in detail.

The mango is a tropical plant belonging to the family Anacardiaceae, and its fruit (mango fruit) is edible. There are no particular restrictions on the origin or variety of the mango fruit used for the invention, and varieties from various origins such as Carabao and Pico from the Philippines, Sundersha or Haden from America or Irwin from Thailand may be used.

"Mango juice" according to the invention refers to the liquid juice obtained from mango fruit as the raw source. The origin or form of the mango juice used for the invention is not particularly restricted, and for example, commercially available mango puree (juice obtained by crushing mango fruit and straining it) or the like may be used. Fermented mango juice obtained by fermenting any such juices may also be mentioned as the mango juice for the invention. The mango juice may alternatively be obtained by washing, heating, peeling, cutting, crushing and straining mango fruit, instead of using commercially available mango puree.

The processed mango juice of the invention may be obtained by depulping mango juice to reduce the pulp content. "Pulp content" according to the invention refers to the insoluble solid matter of the insoluble components, defined in accordance with the Japan Agricultural Standards Test. The pulp content is calculated by the method specified by the Japan Agricultural Standards Test. Specifically, a sample is placed in a centrifugal sedimentation tube, the volume percent of the precipitate obtained by centrifugation using a centrifugal separator with a rotation radius of 14.5 cm, at 20° C., 3000 rpm for 10 minutes is read with an insoluble solid measuring centrifugal precipitation tube (graduated), and the volume is represented as a percentage with respect to the total volume of the sample ("Saishin Kaju/Kajitsu Inryo Jiten" [Revised Dictionary of Juice and Fruit Drinks], Japan Fruit Juice Association, p.547).

The pulp content of the processed mango juice of the invention is preferably no greater than 20%, as the value calculated after restoration to the sugar content of the mango fruit in the squeezed state, from the standpoint of preventing sedimentation of the juice-containing beverage produced by its addition. When emphasis is on swallowability, the pulp content is preferably no greater than 5%, and especially no greater than 1%. The sugar content is the sugar concentration, and it is measured with a sugar refractometer etc.

The processed mango juice obtained by depulping may be further subjected to concentration, drying, etc. The form of the processed mango juice is not particularly restricted and may be liquid, granular, crystalline or fine-granular, but a liquid product is preferred for beverage production.

The mango juice depulping method is not particularly restricted, and centrifugal separation, filtration, membrane separation or the like may be employed, although centrifugal separation is preferably used as an industrially simple method. The type of centrifugal separator used may be a centrifugal sedimentation apparatus (division plate-type, decanter-type, tube-type, etc.) or centrifugal filtration apparatus (basket-type, etc.).

The concentration of mango juice to be supplied to the centrifugal separator may be appropriately set in order to obtain the intended processed mango juice product. That is, the mango juice may be subjected directly to centrifugal separation, or alternatively, because of the high viscosity of mango juice, it may be diluted with a solvent such as water to increase the separation efficiency. The dilution ratio in such cases is preferably a mango juice:water ratio of between 1:0.1 and 1:10 and more preferably between 1:0.5 and 1:5, in terms of volume ratio.

The centrifugal separation conditions are not particularly restricted, and may be appropriately determined in consideration of the type of apparatus, the centrifugal separation effect (×G), the centrifugal separation time, the centrifugal separation temperature, the fluid supply rate, the state of the supplied fruit juice, etc. As an example of the centrifugal separation effect (×G), an effect of about 500 (×G) to 60,000 (×G) can be produced industrially, but 20,000 (×G) is preferred as the upper limit. Considering the performance of apparatuses for large-scale processing, 11,000 (×G) is more preferred as the upper limit. The centrifugal separation temperature may be from 0° C. to 60° C., and preferably about 20° C. to 40° C., in consideration of maintaining quality. The centrifugal separation time will depend on the machine used, but is preferably in a range from about one second to one hour.

When considering the yield etc, the mango juice depulping is preferably carried out at the raw material stage of the mango juice, but it may be carried out at the intermediate product stage for production of beverages containing mixtures of different raw materials in addition to mango juice.

Processed mango juice which has been merely depulped contains flavor components unique to mango in the water-soluble components, and when these are undesirable for the purpose of use, the water-soluble components may be reduced by ultrafiltration or the like to thereby weaken the unique mango flavor.

By adding the processed mango juice of the invention to various beverages it is possible to produce beverages possessing the excellent flavor derived from the juice as well as having low viscosity and little sedimentation, as the product of the invention.

The type of beverage according to the invention is not particularly restricted, and there may be mentioned non-alcoholic beverages such as fruit juice-containing beverages (particularly fruit juice-containing soft drinks), fruit-mixed juices, sports drinks, nutritional drinks, fruit juice-containing flavored carbonated beverages, fruit juice-based "near-water" drinks and diluted beverages (diluted beverages for household consumption, vending machine diluted beverages, etc.), and alcoholic beverages such as fruit wines, liqueurs and the like. The fruit juice-containing beverage of the invention may also contain fruit juice components other than processed mango juice. Specifically, while removing the pulp content from fruit juices other than mango in order to prevent sedimentation reduces the flavor, the processed mango juice of the invention may be added to such fruit juices to produce fruit juice-containing beverages with the rich flavor derived from the fruit.

The amount of processed mango juice according to the invention to be added to a beverage of the invention may be determined as appropriate in consideration of the type of beverage, the content of the various components, the flavor, cost, etc., so long as it is in a range giving a beverage with the excellent flavor derived from the fruit juice, low viscosity and little sedimentation.

When a concentrate is used as the processed mango juice, a diluted beverage may be prepared wherein the amount of processed mango juice added (in terms of the amount when restored to a freshly squeezed state) is expressed as exceeding 100%. However, the amount of processed mango juice added to the beverage is preferably 0.1-100% and more preferably 5-50% for a non-alcoholic beverage, in terms of the concentration in the freshly squeezed state. For an alcoholic beverage, the amount is preferably 0.1-95%, and more preferably 5-30%.

The shape of the container for the beverage of the invention is not particularly restricted, and while plastic containers and glass bottles which allow the contents to be visible are most common, metal (steel or aluminum) cans and paper containers may also be used. Since sedimentation is prevented according to the invention, it is suitable for beverages which are filled into transparent or semi-transparent containers where the color of the contents is visible, color being an aspect closely associated with consumer purchasing motivation.

The present invention may be applied in combination with various hitherto known methods. Specifically, so long as there is no impairment of flavor, it may be combined with methods of adding clarified fruit juices, methods of adding emulsifiers, methods of adding coloring agents or aromas, or methods of adding thickening agent.

EXAMPLES

The present invention will now be explained in greater detail by way of the following examples, which are not intended to limit the scope of the invention in any way.

Example 1

The turbidity was measured for different fruit juices or processed fruit juices before and after depulping.

After depulping 500 ml of different fruit juices at a squeezed-state concentration (100% fruit juice) by centrifugal separation (batch centrifugal separation at 3000 rpm (1500 G) for 10 minutes), the pulp portion was adjusted to under 1%. Each obtained sample was subjected to heat sterilization at 80° C. for 30 minutes to obtain processed fruit juices.

The pulp content was measured according to the Japan Agricultural Standards Test. Specifically, the sample was placed in a centrifugal sedimentation tube, the volume percent of the precipitate obtained by centrifugation using a centrifugal separator with a rotation radius of 14.5 cm, at 20° C., 3000 rpm for 10 minutes was read with an insoluble solid measuring centrifugal precipitation tube (graduated), and the volume was represented as a percentage with respect to the total volume of the sample.

The degree of fruit juice-derived flavor is directly correlated with the concentration of cloudy components. The turbidity of the obtained sample was measured in order to determine the degree of fruit juice-derived flavor. The turbidity measurement was carried out using a turbidimeter by HACH Co. (turbidity units: NTU, detection limit: 10,000 NTU).

Different fruit juices at squeezed-state concentration were also measured in the same manner without centrifugal separation, as control products.

The results are shown in FIG. 1. All of the fruit juices exhibited lower turbidity with depulping. None of the fruit juices except for mango exhibited the target turbidity (approximately 2000 NTU or greater) after depulping. The mango juice, however, exhibited a very high turbidity of approximately 7300 NTU after depulping.

The turbidity of samples of fruit juice and the like is usually considered an indicator of the fruit-derived flavor. It is therefore apparent that most of the fruit juice-derived flavor components remain in the processed mango juice even after depulping of the mango juice, and that for production of beverages with little sedimentation, the mango juice of the invention is useful as a raw material to provide the fruit-derived flavor without raising the viscosity.

Example 2

The influence of the centrifugal effect of centrifugal separation on the turbidity of processed mango juice and particle size distribution of the insoluble components was examined.

The centrifugal effect was set to 4 stages (500, 2800, 11,100 and 44,500 (×G)) for 10-minute batch centrifugal separation, for the rest of the process was the same as in Example 1.

Figure 2:
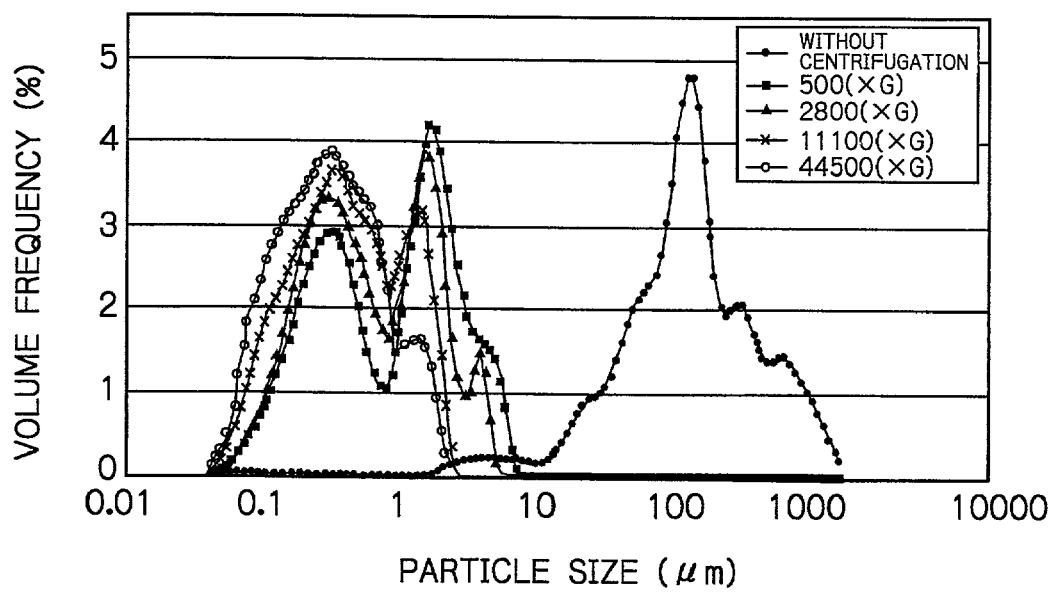
FIG. 2 is graph showing the particle size distribution of processed mango juice prepared with different centrifugal effects (×G).

First, the particle size distributions of the insoluble components in the processed mango juice obtained with different centrifugal effects were measured. The particle size distribution measurement was accomplished using an LS230 Particle Size Distribution Analyzer (measuring range: 0.01-10,000 μm) by Coulter Co., Ltd., and was expressed as volume frequency (%). The results for measurement of the particle size distribution for each centrifugal effect are shown in FIG. 2.

Most of the particles of the samples not subjected to centrifugal separation were 10 μm or larger, but almost no components with a size of 10 μm or larger were found in any of the processed mango juice at the tested centrifugal effects (×G). It was thus demonstrated that large-sized particles of pulp and the like, which are a cause of sedimentation, can be sufficiently removed from processed mango juice obtained with the tested centrifugal effects.

Next, the turbidity of each of the processed mango juice samples obtained with different centrifugal effects was measured. The turbidity was measured by the method described in Example 1. The results for measurement of the turbidity for each centrifugal effect are shown in FIG. 3.

The results showed that the turbidity was lower with a stronger centrifugal effect (×G), and although the turbidity of the sample subjected a centrifugal effect of 44,500 (×G) was below the target turbidity (2000 NTU), the turbidity was above the target turbidity (2000 NTU) with a centrifugal effect in the range of 500-11,100 (×G). For the juices other than mango juice in Example 1, the turbidity was below approximately 2000 NTU with treatment at 1500 (×G), which in comparison demonstrates that a very large portion of cloudy components with the flavor derived from the mango fruit juice are included even when the centrifugal effect is changed.

The demonstrated fact that the turbidity of processed mango juice can be adjusted by the centrifugal effect (×G) indicated that the techniques of the invention can be used in a wide range in accordance with the properties desired for particular beverages.

Example 3

A sample beverage (orange-flavored fruit wine) was prepared using processed mango juice, and the flavor, viscosity and sedimentation were evaluated.

The prescribed amounts of raw materials shown in Table 1 were combined to prepare 5 fruit wine samples (15% fruit juice).

Clarified orange juice was used as the fruit juice for Control Product A. The clarified orange juice used was a commercially available product (concentrated clarified juice, product of Yamaguchi Prefecture Agricultural Cooperative).

Cloudy orange juice was used as the fruit juice for Control Product B. The cloudy orange juice used was a commercially available product (concentrated cloudy juice, product of Citrosuco Co., Ltd.).

For Control Product C, mango juice was added in addition to clarified orange juice as the fruit juice. The mango juice used was a commercially available product (Mango Puree, product of KLT Fruits).

For Control Product D, refined mango juice was added in addition to clarified orange juice as the fruit juice. The refined mango juice used was mango juice homogenized with a high-pressure homogenizer under conditions with a pressure of 150 kg/cm$^2$.

For Sample Product 1, processed mango juice was added in addition to clarified orange juice as the fruit juice component. The processed mango juice was prepared by depulping mango puree by centrifugal separation (batch centrifugal separation at 1500 G for 10 minutes) to a pulp content of less than 1%.

The liquid mixtures were heat sterilized at 70° C. for 10 minutes and then filled into 100 ml transparent bottles (110 ml volume) and sealed to obtain fruit wines.

TABLE 1

|  | Control product A | Control product B | Control product C | Control product D | Sample product 1 |
|---|---|---|---|---|---|
| Grape wine | 800 ml | 800 ml | 800 ml | 800 ml | 800 ml |
| Clarified orange juice | 150 ml | 0 ml | 100 ml | 100 ml | 100 ml |
| Cloudy orange juice | 0 ml | 150 ml | 0 ml | 0 ml | 0 ml |
| Mango juice | 0 ml | 0 ml | 50 ml | 0 ml | 0 ml |
| Refined mango juice | 0 ml | 0 ml | 0 ml | 50 ml | 0 ml |
| Processed mango juice | 0 ml | 0 ml | 0 ml | 0 ml | 50 ml |
| Total | 1 l | 1 l | 1 l | 1 l | 1 l |

The sedimentation, viscosity and fruit-derived flavor of these fruit wines were evaluated.

The sedimentation was evaluated with passing time. Specifically, an evaluation on 3 levels indicating it as present (++), slightly present (+) or not present (−), was conducted two times, once immediately after production (hereunder referred to as "at production") and once after standing for 24 hours(hereunder referred to as "after production").

For the viscosity, an organoleptic test was conducted with 5 panelists who evaluated the viscosity on the 5-level scale of "high" (5 points), "somewhat high" (4 points), "ordinary" (3 points), "somewhat low" (2 points) or "low" (1 point), and the average score of the 5 panelists was calculated.

For the fruit-derived flavor, an organoleptic test was conducted with 5 panelists who evaluated it on the 5-level scale of "conspicuous" (5 points), "somewhat conspicuous" (4 points), "ordinary" (3 points), "somewhat inconspicuous" (2 points) or "inconspicuous" (1 point), and the average score of the 5 panelists was calculated.

The results are shown in Table 2.

TABLE 2

|  | Control product A | Control product B | Control product C | Control product D | Sample product 1 |
|---|---|---|---|---|---|
| Sedimentation (at production) | − | ++ | ++ | − | − |
| Sedimentation (after storage) | − | ++ | ++ | + | − |
| Viscosity | 1.2 | 4.8 | 4.6 | 4.4 | 1.4 |
| Flavor | 1.8 | 4.6 | 4.2 | 4.2 | 4.0 |

No sedimentation was found in Control Product A either at production or after storage. The viscosity was also satisfactorily low. However, the flavor was poor compared to the other 4 beverages.

With Control Product B, the flavor was greatly improved but considerable sedimentation was present. In addition, the viscosity was unacceptably higher than Control Product A. It was thus shown that, although using cloudy juice improves the flavor, the evaluation is lower for viscosity and sedimentation.

With Control Product C, the flavor was greatly improved compared to Control Product A, but considerable sedimentation was found. In addition, the viscosity was unacceptably higher than Control Product A. It was thus shown that, although simply adding mango juice to the beverage improves the flavor, the evaluation is lower for viscosity and sedimentation.

With Control Product D, the flavor was equally as satisfactory as Control Product C. The viscosity was slightly improved but was not satisfactory compared to Control Product A. No sedimentation was found at production, but slight sedimentation was found after storage. It was thus shown that, although adding refined mango juice to the beverage improves the flavor, the viscosity is higher and sedimentation during storage cannot be prevented.

In contrast, Sample Product 1 according to the invention exhibited no sedimentation either at production X or after storage, similar to Control Product A. The viscosity was also approximately as satisfactorily low as Control Product A, and the flavor was approximately as satisfactory as Control Products C and D. That is, the results were satisfactory for all of the evaluated properties.

It was thus shown that using processed mango juice can yield a beverage with little sedimentation, low viscosity and the excellent flavor derived from the fruit juice.

Example 4

A sample liqueur was prepared as an example of an alcoholic beverage using processed mango juice.

The processed mango juice was prepared by depulping mango puree by centrifugal separation (batch centrifugal separation at 1500 G for 10 minutes) to a pulp content of less than 1%.

Granular sugar as sucrose was dissolved in purified water at 50° C. in an amount measured for a final concentration of 20 g/L, and then 0.3 ml of processed mango juice, 2.7 ml of lemon juice, 20 ml of 60% alcohol, 1.7 g of citric acid and 1 ml of flavoring were added and the total amount was adjusted with purified water to a final volume of 300 ml, after which the mixture was heat sterilized at 70° C. for 10 minutes and then filled into 100 ml transparent bottle (110 ml volume) and sealed to obtain a cocktail (alcohol level: 4%, fruit juice: 2%) as a processed mango juice-containing liqueur (Sample Product 2). That is, a beverage was obtained with a processed mango juice content of 0.1% in terms of the amount when restored to a squeezed-state concentration.

TABLE 3

|  | Sample Product 2 |
|---|---|
| Sedimentation (at production) | — |
| Sedimentation (after storage) | — |
| Viscosity | 1.6 |
| Flavor | 3.8 |

The results of evaluation of this sample product in the same manner as Example 3, as shown in Table 3, showed it to be a satisfactory beverage with little sedimentation and low viscosity, and exhibiting the excellent flavor derived from the juice.

Example 5

A sample juice-containing soft drink was prepared as an example of a non-alcoholic beverage using processed mango juice.

The processed mango juice was prepared by depulping mango puree by centrifugal separation (batch centrifugal separation at 11,000 G for 10 minutes) to a pulp content of less than 0.1%. A 1000 ml portion of the processed mango juice was heat sterilized at 80° C. for 30 minutes, and then filled into 160 ml transparent bottle (180 ml volume) and sealed to obtain a 100% fruit juice soft drink (Sample Product 3). That is, a beverage was obtained with a processed mango juice content of 100% in terms of the amount when restored to a squeezed-state concentration.

The results of evaluation of this sample product in the same manner as Example 3, as shown in Table 4, showed it to be a satisfactory beverage with little sedimentation and low viscosity, and exhibiting the excellent flavor derived from the juice.

TABLE 4

|  | Sample Product 3 |
| --- | --- |
| Sedimentation (at production) | — |
| Sedimentation (after storage) | — |
| Viscosity | 1.4 |
| Flavor | 5.0 |

A sample fruit wine was prepared as an example of an alcoholic beverage using processed mango juice.

The processed mango juice was prepared by depulping mango puree by centrifugal separation (batch centrifugal separation at 1500 G for 2 minutes) to a pulp content of 20%.

Specifically, a liquid mixture was prepared containing 800 ml of apple wine, 180 ml of clarified apple juice and 20 ml of processed mango juice, and the mixture was heat sterilized at 70° C. for 10 minutes and then filled into 100 ml transparent bottles (110 ml volume) and sealed to obtain a fruit wine (apple-flavored fruit wine) (Sample Product 4).

The results of evaluation of this sample product in the same manner as Example 3, as shown in Table 5, showed it to be a satisfactory beverage with little sedimentation and low viscosity, and exhibiting the excellent flavor derived from the juice.

TABLE 5

|  | Sample Product 4 |
| --- | --- |
| Sedimentation (at production) | — |
| Sedimentation (after storage) | — |
| Viscosity | 2.0 |
| Flavor | 3.6 |

What is claimed is:

1. Processed mango juice having a reduced amount of mango juice pulp,
   wherein the processed mango juice has a pulp content which is no greater than 20 vol % and a turbidity above 2000 NTU, when restored to a concentration of a squeezed juice based on sugar content,
   wherein the reduction of pulp content has been effected by centrifugal separation, wherein the pulp components having a particle size over 10 μm are reduced by the centrifugal separation selectively to those having a particle size of 10 μm or less, and
   wherein the processed mango juice has not been subjected to ultrafiltration.

2. Processed mango juice according to claim 1, wherein the centrifugal effect of the centrifugal separation is between 500-11,000(×G).

3. Processed mango juice according to claim 1, wherein the mango juice is in the form of a mango puree.

4. A beverage containing processed mango juice according to claim 1.

5. A beverage according to claim 4, wherein the processed mango juice imparts flavor to the beverage without inducing sedimentation or viscosity reduction to the beverage.

6. A beverage according to claim 4, wherein the processed mango juice is added in an amount from 0.1% to 100% based on the concentration in a squeezed juice state.

7. A beverage according to claim 6, wherein the beverage is an alcoholic beverage.

8. A beverage according to claim 7, wherein the alcoholic beverage is a fruit wine.

9. A beverage according to claim 7, wherein the alcoholic beverage is a liqueur.

10. A beverage according to claim 4, which is filled into a transparent or semi-transparent container.

11. Processed mango juice according to claim 1, wherein the pulp components in the processed mango juice exhibit particle size peaks as determined by volume frequency in the particle size distribution curve within a range between 0.01 and 10 μm.

12. Processed mango juice according to claim 1, wherein the pulp content is no greater than 5 vol %.

13. Processed mango juice according to claim 1, wherein the pulp content is no greater than 1 vol %.

* * * * *